Aug. 6, 1968  D. S. EASTON  3,396,259

METHOD FOR ELECTRO-DISCHARGE MACHINING

Filed Aug. 30, 1965

INVENTOR.
Dewey S. Easton
BY
ATTORNEY.

United States Patent Office 3,396,259
Patented Aug. 6, 1968

3,396,259
METHOD FOR ELECTRO-DISCHARGE MACHINING
Dewey S. Easton, Lenoir City, Tenn., assignor to the United States of America as represented by the United States Atomic Energy Commission
Filed Aug. 30, 1965, Ser. No. 483,893
2 Claims. (Cl. 219—69)

ABSTRACT OF THE DISCLOSURE

The cutting tool of a spark cutting device is vibrated in a plane parallel to the surface of a workpiece being worked such as to provide a substantial increase in the cutting rate, to yield good machine stability, and to substantially reduce the wear rate of the tool, thus permitting the use of a tool having a high melting point and a low vapor pressure.

---

Electro-discharge machining (EDM), also referred to as spark-erosion, is the term applied to removal and shaping of metals by use of variable voltage, variable amperage pulsating electrical energy. The operation usually occurs in a dielectric fluid such as deodorized kerosene, transformer oil or other suitable hydrocarbon liquid. The discharge from a condenser results in a high intensity spark that bridges the gap between cutting tool (cathode) and the workpiece (anode). The dielectric serves as insulator, coolant and medium for removal of eroded particles. The unique advantage of EDM is that any metal, without regard to hardness, can be readily machined. Electrically conducting-type ceramic materials, such as tungsten carbide, can be readily cut. Also, prehardened die blocks can be cut without worry of distortion due to heat treatment in a subsequent operation.

The usual cutting tools for EDM include aluminum, brass, tantalum, stainless steel, etc. The cutting tools are selected for various applications depending on the type of cut, tool wear characteristics, and machine stability. Generally speaking, the lower-melting-point tools give good machine stability and cutting rates, but suffer from excessive tool wear. Tools having higher melting temperatures generally exhibit lower wear rates but are not satisfactory for use due to poor machine stability. The term "machine stability" refers to the ease with which the discharge is made and the rapidity with which sparking can be continued, i.e., the ease with which a continuous spark discharge is maintained. Thus, there exists a need for an EDM process wherein low-wear tools can be efficiently used while at the same time good machine stability can be maintained.

Therefore, it is the object of the present invention to provide an improved method for spark machining in which machine stability using low-wear tools is substantially improved while at the same time extending the life of the tools and also increasing the rate of metal removal.

Figure 2:
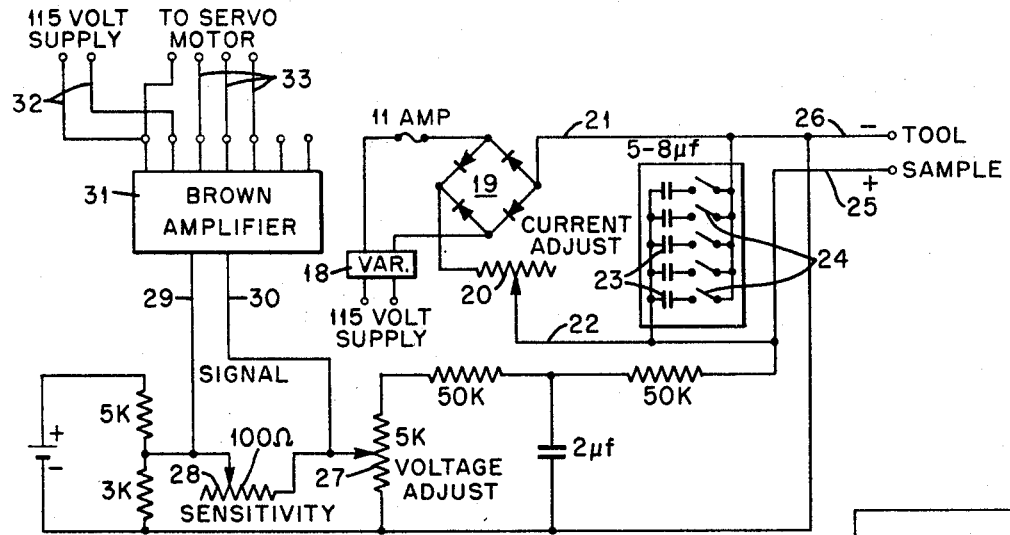
Figure 1:
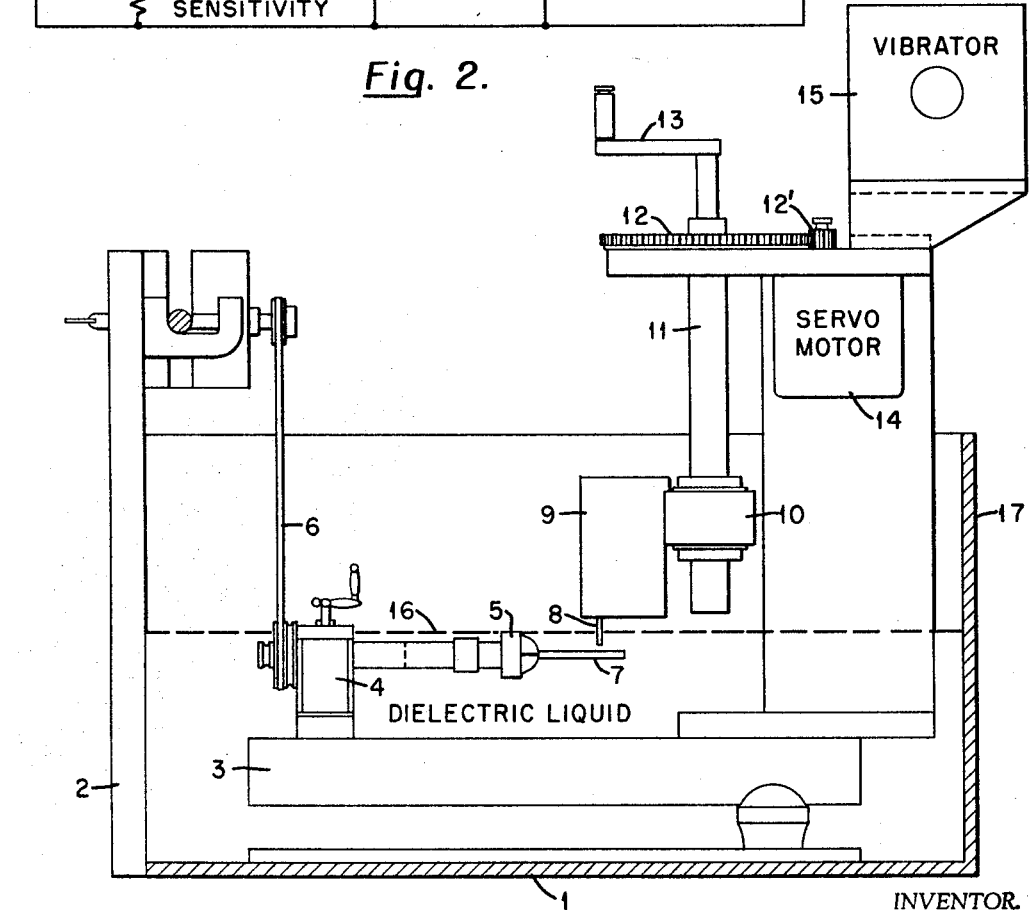

This and other objects and advantages of the present invention will become apparent upon a consideration of the following detailed specification and the accompanying drawing, wherein:

FIG. 1 is a schematic showing of the spark cutting device of the present invention, and FIG. 2 is a wiring diagram of the control circuit for the device of FIG. 1.

The above object has been accomplished in the present invention by providing means for vibrating the cutting tool of a spark cutting device in a plane parallel to the surface to be worked of a workpiece. It was discovered that by utilizing such a vibrating means the cutting rate is not only increased, but also that low-wear tools can be used, yielding good machine stability which was not heretofore possible using such tools. Also, the wear rate of such tools has been substantially reduced when the vibrating means is utilized in the cutting process.

With reference to the drawing, in FIG. 1, a base member 1 provided with a side wall 17, and front and back walls, not shown, is affixed to a support member 2 to form a tank unit in which a dielectric liquid 16 is disposed. A member 3 mounted in the lower portion of the tank unit supports a chuck holder 4. The holder 4 supports a chuck to which a workpiece holder 5 is attached for holding a workpiece 7. A cutting tool 8 is held in close proximity to the workpiece 7 by means of tool positioning means 9. Means 9 is coupled to a worm gear 10, and this worm gear in turn can be actuated either manually by means of a member 13 or automatically by means of a servomotor 14 coupled by a gear 12' and gear 12 to a worm screw member, not shown, mounted within a member 11.

The workpiece 7 may be moved or held stationary with respect to the cutting tool 8, depending upon which type of cutting operation is desired. When it is desired to move the workpiece 7, it may be moved longitudinally in a conventional manner or rotated by means of a motor, not shown, coupled to the chuck by means of a belt drive 6.

A vibrator 15 is employed for vibrating the cutting tool. The vibrator 15 includes a small variable speed motor mounted on the tool holder and having a cam-shaped weight attached to its output shaft. The frequency and amplitude of the vibration applied to the cutting tool can be varied by changing the rotational speed of the motor. Thus, in order for the motor of the vibrator 15 to effect vibration of the elongated tool 8 in a plane parallel to the surface to be worked of the workpiece 7, as set forth hereinabove, it should be self-evident that the output shaft of the vibrator motor would have to have its axis oriented in a vertical direction and thus the cam-shaped weight attached to the motor output shaft would then also rotate in a plane parallel to the surface to be worked of the workpiece 7, to thus effect the horizontal vibration of the tool 8 and thus the face thereof in the parallel plane as indicated above.

With reference to the circuit of FIG. 2, a 115-volt supply is connected to variable voltage transformer 18 which in turn is coupled to a full-wave rectifier 19. The output of rectifier 19 is connected by one output lead to a current adjust potentiometer 20 and through a lead 22 to a plurality of condensers 23. Lead 22 is also connected by means of a lead 25 to the workpiece or sample 7 to be cut. The other output lead 21 of rectifier 19 is connected to a plurality of manual switches 24. Lead 21 is also connected by means of a lead 26 to the tool 8. A desired and selected one of the condensers 23 is connected by its corresponding manual switch 24 across the leads 21 and 22 such that a charge is built up on the selected condenser until the dielectric breakdown voltage between the tool and the workpiece or sample is exceeded to thus effect a spark discharge between the tool and workpiece by discharging of the condenser. The condenser is then recharged and the cycle repeated. Thus, cutting results when a rapid series of spark discharges of controlled energy is effected between the tool and the workpiece. The workpiece is eroded at a rate dependent upon the energy and frequency of the discharges.

Since the breakdown voltage of the dielectric is proportional to the width of the spark gap, this voltage can be monitored and used as a signal to a servo-system, coupled to the tool advance mechanism to automatically advance the cutting tool, as mentioned above, and to maintain an optimum gap between the tool and workpiece. The tool must not touch the workpiece to assure strain-free machining. The dielectric breakdown voltage is monitored by leads connected to leads 25 and 26 and connected by means of a voltage adjust potentiometer 27 and a sensitivity potentiometer 28 to leads 29 and 30 as shown in FIG. 2. The leads 29 and 30 are connected to an amplifier 31. The amplifier 31 is connected to a source of 115-volt supply by means of leads 32. The output of amplifier 31 is connected by means of leads 33 to the servomotor 14 of FIG. 1. Thus, the monitored voltage between the tool and workpiece can be used to automatically maintain an optimum gap between the tool and workpiece during a cutting operation.

The following operating example will describe the present invention in greater detail and illustrate the improvement in operating results that can be obtained in the operation of the above described spark cutting device.

A specimen of 0.0485-inch-thick aluminum was mounted in the specimen holder 5 and the dielectric tank filled with transformer fluid. Several cuts were made in the aluminum specimen using cutting tools of tantalum, brass and stainless steel approximately 1/16 inch thick. The potential difference between the tool and specimen was 58 volts and the discharge current alternated from 1.6 to 1.9 amperes. The cutting tool was vibrated by the small variable speed motor of the vibrator 15. Cuts were made both with and without vibration of the cutting tool. Each cut was terminated after a period of 30 minutes or after the cut was completed, whichever occurred first. The cutting rates obtained from these runs are shown in Table I below. The machine stability and cutting rates were excellent in each of the vibrated runs. The tantalum tools were seen to arc and stick to the workpiece in the nonvibrated runs, an indication of poor stability.

TABLE I

| Tool Material | Cutting Rate, mils/min. | | Increase in Cutting Rate with Vibration, percent |
|---|---|---|---|
| | With Vibration | Without Vibration | |
| Tantalum | 64 | 0.87 | 7,356 |
| Brass | 42 | 4.4 | 954 |
| Stainless Steel | 46 | 1.0 | 4,567 |

Table II below shows the wear rate of the various cutting tools tested. The wear rate on the softer material, brass, shows no improvement with vibration, but the tantalum and stainless steel tools show improvements by a factor of 20 and 2, respectively.

TABLE II

| Tool Material | Wear Rate on Cutting Tool, mils/min./mil of Sample Removed | |
|---|---|---|
| | With Vibration | Without Vibration |
| Tantalum | 0.004 | 0.08 |
| Brass | 0.21 | 0.17 |
| Stainless Steel | 0.05 | 0.10 |

The most significant feature of the present invention is the discovery that vibration helps to stabilize the spark discharge. Thus, the good qualities of cutting tools such as tantalum, stainless steel, tungsten, and any other high-melting-point, low-vapor-pressure metal which, in the prior art have been avoided due to the inability to stabilize the discharge, can now be used. Also, the wear rate of such tools is substantially reduced and the cutting rate of such tools is substantially increased when vibration is utilized, as pointed out above.

The frequency and amplitude of vibration of the tool is not critical. However, it is preferred to keep the amplitude of vibration at a low value since it has been found that cuts made under vibration are somewhat wider than nonvibrated cuts.

In metals research it is desirable to obtain strain-free specimens for study. Single crystals of metals such as tungsten, niobium and zirconium are difficult to machine and specimens obtained by mechanical methods for study are normally deformed to the extent of interfering with magneto-resistance studies. Utilization of the present invention permits single crystals of these materials to be machined to desired shapes and sizes rapidly without introduction of strain.

This invention has been described by way of illustration rather than limitation and it should be apparent that it is equally applicable in fields other than those described.

What is claimed is:

1. An improved electro-discharge machining system comprising a dielectric tank containing a dielectric fluid; a workpiece; a holder for holding said workpiece; a low-wear elongated tool; a holder for holding said low-wear tool, said tool consisting of any high-melting-point, low-vapor-pressure metal, said workpiece holder and workpiece and said tool being disposed in said dielectric fluid within said tank; means connected to said tool holder and tool for vibrating them at a selected frequency and amplitude in a plane parallel to the surface to be worked of said workpiece; power supply means connected between said workpiece and said tool for providing periodic spark discharges therebetween; and a tool advance mechanism for maintaining an optimum gap between the tool and workpiece during a cutting operation, whereby use of said vibrating means provides good machine stability with substantially improved cutting rates and substantially decreased tool wear.

2. In a method for the electro-discharge machining of a workpiece including the steps of mounting said workpiece in a dielectric fluid disposed in a tank unit, adjustably positioning a low-wear elongated tool member having a high melting point and a low vapor pressure in close proximity to said workpiece within said fluid to maintain an optimum gap between said workpiece and tool, and connecting a source of operating power between said tool and workpiece to provide periodic spark discharges between said tool and workpiece, the improvement comprising the step of vibrating said tool at a selected frequency and amplitude in a plane parallel to the surface to be worked of said workpiece, thereby providing good machine stability using such low-wear tool and at the same time providing substantially improved cutting rates and lower tool wear rates during a cutting operation.

References Cited

UNITED STATES PATENTS

| 2,385,665 | 9/1945 | Warwick | 219—69 |
| 2,794,110 | 5/1957 | Griffith | 219—69 |
| 3,109,086 | 10/1963 | Cole | 219—69 |

RICHARD M. WOOD, *Primary Examiner.*

R. F. STAUBLY, *Assistant Examiner.*